(12) United States Patent
Bhangle et al.

(10) Patent No.: US 12,547,489 B2
(45) Date of Patent: Feb. 10, 2026

(54) AUTOMATED SYSTEM CRASH ANALYSIS AND REMEDIATION

(71) Applicant: Dell Products L.P., Round Rock, TX (US)

(72) Inventors: Pankaj Bhangle, Sadashivgad Karwar (IN); Filipe Lussana, Porto Alegre (BR); Thales Dias, Canoas (BR); Andre Reginatto, Canoas (BR); Jeziel Brizolla, Porto Alegre (BR)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/676,780

(22) Filed: May 29, 2024

(65) Prior Publication Data

US 2025/0370852 A1 Dec. 4, 2025

(51) Int. Cl.
*G06F 11/00* (2006.01)
*G06F 11/07* (2006.01)

(52) U.S. Cl.
CPC ...... *G06F 11/0793* (2013.01); *G06F 11/0778* (2013.01); *G06F 11/079* (2013.01)

(58) Field of Classification Search
CPC . G06F 11/0793; G06F 11/0778; G06F 11/079
See application file for complete search history.

(56) References Cited

U.S. PATENT DOCUMENTS

| | | | | |
|---|---|---|---|---|
| 5,933,838 | A * | 8/1999 | Lomet | G06F 11/1471 |
| 8,086,596 | B2 * | 12/2011 | Bernardini | G06F 16/23 |
| | | | | 707/713 |
| 9,558,080 | B2 * | 1/2017 | Bradshaw | G06F 11/1441 |
| 11,301,355 | B2 * | 4/2022 | Gong | G06F 11/079 |
| 11,360,839 | B1 * | 6/2022 | Hsiao | G06F 13/4282 |
| 2015/0193296 | A1 * | 7/2015 | Chen | G06F 11/0778 |
| | | | | 714/15 |

(Continued)

OTHER PUBLICATIONS

Microsoft, "What is PowerShell?" https://learn.microsoft.com/en-us/powershell/scripting/overview?view=powershell-7.4, Mar. 7, 2024, 3 pages.

(Continued)

*Primary Examiner* — Jonathan D Gibson
(74) *Attorney, Agent, or Firm* — Ryan, Mason & Lewis, LLP

(57) ABSTRACT

An apparatus comprises at least one processing device configured to monitor for designated system crash event types and, responsive to detecting at least one designated system crash event type on a first information technology (IT) asset, to copy system crash log files from the first IT asset and to process the copied system crash log files to generate a first crash dump analysis data structure associated with the first IT asset. The at least one processing device is further configured to generate, based at least in part on the first crash dump analysis data structure and additional crash dump analysis data structures associated with additional IT assets, a system crash root cause analysis data structure. The at least one processing device is further configured to apply remedial actions, selected based at least in part on the system crash root cause analysis data structure, to a plurality of IT assets.

20 Claims, 11 Drawing Sheets

(56) References Cited

U.S. PATENT DOCUMENTS

| | | | |
|---|---|---|---|
| 2015/0317477 A1* | 11/2015 | Piper | G06F 21/55 |
| | | | 726/23 |
| 2017/0010935 A1* | 1/2017 | Vaden | G06F 11/0778 |
| 2018/0322016 A1* | 11/2018 | Debata | G06F 11/1441 |
| 2023/0289253 A1* | 9/2023 | Keshwani | G06F 11/073 |
| 2023/0315560 A1* | 10/2023 | Hughes | G06F 11/0793 |
| | | | 714/4.2 |
| 2024/0338273 A1* | 10/2024 | Philip | G06F 11/0751 |
| 2024/0370271 A1* | 11/2024 | Sayyed | G06F 9/4401 |
| 2025/0013521 A1* | 1/2025 | Parthasarathy | G06F 11/0766 |
| 2025/0265170 A1* | 8/2025 | Burney | G06F 11/3476 |

OTHER PUBLICATIONS

Microsoft, "Bug Check Code Reference," https://learn.microsoft.com/en-us/windows-hardware/drivers/debugger/bug-check-code-reference2, Nov. 22, 2022, 18 pages.
Microsoft, "Power BI," https://www.microsoft.com/en-us/power-platform/products/power-bi, Accessed May 16, 2024, 6 pages.
Microsoft, "WinDbg," https://apps.microsoft.com/detail/9pgjgd53tn86?rtc=1&hl=en-us&gl=US, Accessed May 16, 2024, 6 pages.

\* cited by examiner

715

| DEVICE ERROR LABEL | QUANTITY | % |
|---|---|---|
| - | 19875 | 83.36% |
| DRIVER POWER STATE FAILURE | 7082 | 5.58% |
| CRITICAL PROCESS DIED | 3049 | 1.64% |
| PDC WATCHDOG TIMEOUT | 2772 | 1.68% |
| SYSTEM THREAD EXCEPTION NOT HANDLED | 2623 | 1.32% |
| POWER WATCHDOG TIMEOUT | 1877 | 0.98% |
| SYSTEM SERVICE EXCEPTION | 1749 | 0.75% |
| PNP DETECTED FATAL ERROR | 1214 | 0.71% |
| VIDEO MEMORY MANAGEMENT INTERNAL | 1035 | 0.62% |
| INTERNAL POWER ERROR | 887 | 0.51% |
| PAGE FAULT IN NONPAGED AREA | 770 | 0.29% |
| KERNEL SECURITY CHECK FAILURE | 551 | 0.22% |
| ... | ... | ... |
| TOTAL | 23399 | 100.00% |

720

| FAILURE BUCKET IDENTIFIER (ID) | QUANTITY |
|---|---|
| FAILURE_BUCKET_ID_1 | 2254 |
| FAILURE_BUCKET_ID_2 | 1448 |
| FAILURE_BUCKET_ID_3 | 945 |
| FAILURE_BUCKET_ID_4 | 838 |
| FAILURE_BUCKET_ID_5 | 703 |
| FAILURE_BUCKET_ID_6 | 650 |
| FAILURE_BUCKET_ID_7 | 517 |
| FAILURE_BUCKET_ID_8 | 433 |
| FAILURE_BUCKET_ID_9 | 321 |
| ... | ... |
| TOTAL | 23399 |

| IMAGE NAME | QUANTITY |
|---|---|
| SAMPLE_EXE_1.EXE | 5649 |
| SAMPLE_SYS_1.SYS | 2255 |
| SAMPLE_SYS_2.SYS | 1193 |
| SAMPLE_SYS_3.SYS | 1147 |
| SAMPLE_SYS_4.SYS | 983 |
| SAMPLE_SYS_5.SYS | 932 |
| SAMPLE_EXE_2.EXE | 686 |
| SAMPLE_EXE_3.EXE | 547 |
| SAMPLE_SYS_6.SYS | 540 |
| SAMPLE_SYS_7.SYS | 536 |
| ... | ... |
| TOTAL | 23399 |

730

| PROCESS NAME | QUANTITY |
|---|---|
| SAMPLE_PROCESS_1 | 10751 |
| SAMPLE_PROCESS_2 | 5938 |
| SAMPLE_PROCESS_3 | 1545 |
| SAMPLE_PROCESS_4 | 1094 |
| SAMPLE_PROCESS_5 | 750 |
| SAMPLE_PROCESS_6 | 686 |
| SAMPLE_PROCESS_7 | 312 |
| SAMPLE_PROCESS_8 | 189 |
| SAMPLE_PROCESS_9 | 86 |
| SAMPLE_PROCESS_10 | 73 |
| SAMPLE_PROCESS_12 | 72 |
| ... | ... |
| TOTAL | 2339919 |

FIG. 7C

AUTOMATED SYSTEM CRASH ANALYSIS AND REMEDIATION

BACKGROUND

Support platforms may be utilized to provide various services for sets of managed computing devices. Such services may include, for example, troubleshooting and remediation of issues encountered on computing devices managed by a support platform. This may include periodically collecting information on the state of the managed computing devices, and using such information for troubleshooting and remediation of the issues. Such troubleshooting and remediation may include receiving requests to provide servicing of hardware and software components of computing devices. For example, users of computing devices may submit service requests to a support platform to troubleshoot and remediate issues with hardware and software components of computing devices. Such requests may be for servicing under a warranty or other type of service contract offered by the support platform to users of the computing devices.

SUMMARY

Illustrative embodiments of the present disclosure provide techniques for automated system crash analysis and remediation.

In one embodiment, an apparatus comprises at least one processing device comprising a processor coupled to a memory. The at least one processing device is configured to monitor an information technology infrastructure environment for one or more designated system crash event types, the information technology infrastructure environment comprising a plurality of information technology assets. The at least one processing device is also configured, responsive to detecting at least one of the one or more designated system crash event types on at least a first one of the plurality of information technology assets, to copy one or more system crash log files from the first information technology asset to a system crash database. The at least one processing device is further configured to process the one or more system crash log files copied to the system crash database to generate a first crash dump analysis data structure associated with the first information technology asset, the first crash dump analysis data structure characterizing one or more parameters of the first information technology asset experiencing at least one system crash event. The at least one processing device is further configured to generate, based at least in part on the first crash dump analysis data structure associated with the first information technology asset and one or more additional crash dump analysis data structures associated with one or more additional ones of the plurality of information technology assets, a system crash root cause analysis data structure characterizing at least one root cause of system crash events occurring on the first information technology asset and the one or more additional information technology assets. The at least one processing device is further configured to apply one or more remedial actions, selected based at least in part on the system crash root cause analysis data structure, to at least a subset of the plurality of information technology assets to reduce a likelihood of the subset of the plurality of information technology assets experiencing system crash events.

These and other illustrative embodiments include, without limitation, methods, apparatus, networks, systems and processor-readable storage media.

BRIEF DESCRIPTION OF THE DRAWINGS

FIGS. 7A-7C show visualizations produced by an automated system crash analysis tool in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
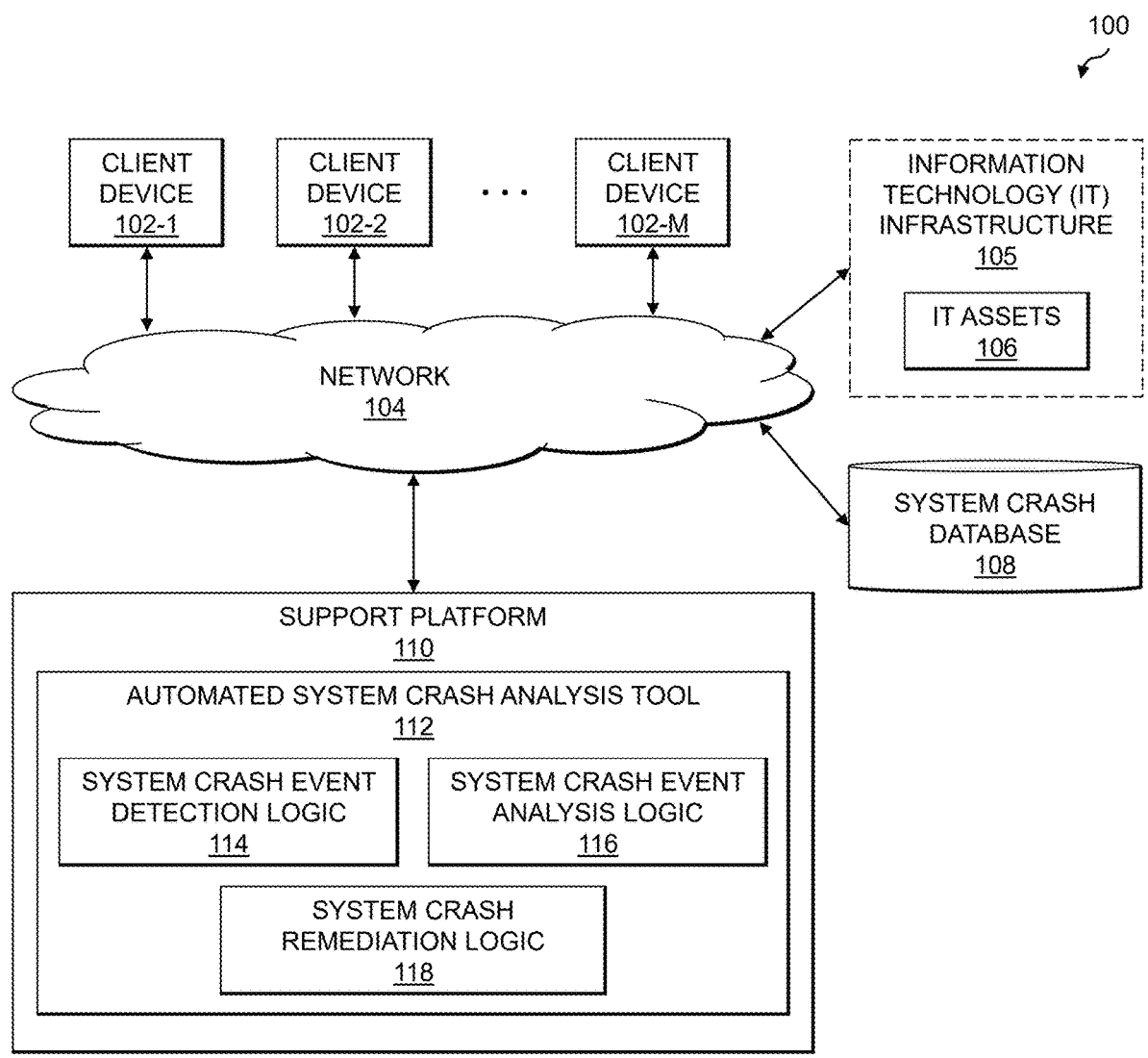
FIG. 1 is a block diagram of an information processing system configured for automated system crash analysis and remediation in an illustrative embodiment.

FIG. 1 shows an information processing system 100 configured in accordance with an illustrative embodiment. The information processing system 100 is assumed to be built on at least one processing platform and provides functionality for automated system crash analysis and remediation. The information processing system 100 includes a set of client devices 102-1, 102-2, . . . 102-M (collectively, client devices 102) which are coupled to a network 104. Also coupled to the network 104 is an information technology (IT) infrastructure 105 comprising one or more IT assets 106, a system crash database 108, and a support platform 110. The IT assets 106 may comprise physical and/or virtual computing resources in the IT infrastructure 105. Physical computing resources may include physical hardware such as servers, storage systems, networking equipment, Internet of Things (IoT) devices, other types of processing and computing devices including desktops, laptops, tablets, smartphones, etc. Virtual computing resources may include virtual machines (VMs), containers, etc.

In some embodiments, the support platform 110 is used for an enterprise system. For example, an enterprise may subscribe to or otherwise utilize the support platform 110 for managing IT assets 106 of the IT infrastructure 105 operated by that enterprise. Users of the enterprise associated with different ones of the client devices 102 may utilize the support platform 110 in order to manage problems or other issues (e.g., system crashes) which are encountered on different ones of the IT assets 106. As used herein, the term "enterprise system" is intended to be construed broadly to include any group of systems or other computing devices. For example, the IT assets 106 of the IT infrastructure 105 may provide a portion of one or more enterprise systems. A given enterprise system may also or alternatively include one or more of the client devices 102. In some embodiments, an enterprise system includes one or more data centers, cloud infrastructure comprising one or more clouds, etc. A given enterprise system, such as cloud infrastructure, may host assets that are associated with multiple enterprises (e.g., two or more different businesses, organizations or other entities).

The client devices 102 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 102 may also or alternately comprise virtualized computing resources, such as VMs, containers, etc.

The client devices 102 in some embodiments comprise respective computers associated with a particular company, organization or other enterprise. Thus, the client devices 102 may be considered examples of assets of an enterprise system. In addition, at least portions of the information processing system 100 may also be referred to herein as collectively comprising one or more "enterprises." Numerous other operating scenarios involving a wide variety of different types and arrangements of processing nodes are possible, as will be appreciated by those skilled in the art.

The network 104 is assumed to comprise a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks.

The system crash database 108 is configured to store and record various information that is utilized by the support platform 110. Such information may include, for example, crash dump files or other logs generated in the event of system crashes, system crash analysis reports, etc. The system crash database 108 may be implemented utilizing one or more storage systems. The term "storage system" as used herein is intended to be broadly construed. A given storage system, as the term is broadly used herein, can comprise, for example, content addressable storage, flash-based storage, network-attached storage (NAS), storage area networks (SANs), direct-attached storage (DAS) and distributed DAS, as well as combinations of these and other storage types, including software-defined storage. Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the support platform 110, as well as to support communication between the support platform 110 and other related systems and devices not explicitly shown.

The support platform 110 may be provided as a cloud service that is accessible by one or more of the client devices 102 to allow users thereof to manage servicing of the IT assets 106 of the IT infrastructure 105, the client devices 102 themselves, other products which are serviced by the support platform 110, etc. The client devices 102 may be configured to access or otherwise utilize the support platform 110 to track and manage system crash events occurring on the IT assets 106 (or other products, such as the client devices 102 themselves). In some embodiments, the client devices 102 are assumed to be associated with system administrators, IT managers, support engineers or other authorized personnel responsible for managing or performing servicing of the IT assets 106. In some embodiments, the IT assets 106 of the IT infrastructure 105 are owned or operated by the same enterprise that operates the support platform 110. In other embodiments, the IT assets 106 of the IT infrastructure 105 may be owned or operated by one or more enterprises different than the enterprise which operates the support platform 110 (e.g., a first enterprise provides support for multiple different customers, business, etc.). Various other examples are possible.

In some embodiments, the client devices 102 and/or the IT assets 106 of the IT infrastructure 105 may implement host agents that are configured for automated transmission of information with the support platform 110. It should be noted that a "host agent" as this term is generally used herein may comprise an automated entity, such as a software entity running on a processing device. Accordingly, a host agent need not be a human entity.

The support platform 110 in the FIG. 1 embodiment is assumed to be implemented using at least one processing device. Each such processing device generally comprises at least one processor and an associated memory, and implements one or more functional modules or logic for controlling certain features of the support platform 110. In the FIG. 1 embodiment, the support platform 110 implements an automated system crash analysis tool 112. The automated system crash analysis tool 112 comprises system crash event detection logic 114, system crash event analysis logic 116, and system crash remediation logic 118. The system crash event detection logic 114 is configured to monitor an IT infrastructure environment (e.g., IT infrastructure 105) for one or more designated system crash event types. The system crash event detection logic 114 is also configured, responsive to detecting at least one of the one or more designated system crash event types on at least a first one of the IT assets 106, to copy one or more system crash log files from the first IT asset to the system crash database 108. The system crash event analysis logic 116 is configured to process the one or more system crash log files copied to the system crash database 108 to generate a first crash dump analysis data structure associated with the first IT asset, the first crash dump analysis data structure characterizing one or more parameters of the first IT asset experiencing at least one system crash event. The system crash event analysis logic 116 is also configured to generate, based at least in part on the first crash dump analysis data structure associated with the first IT asset and one or more additional crash dump analysis data structures associated with one or more additional ones of the IT assets 106, a system crash root cause analysis data structure characterizing at least one root cause of system crash events occurring on the first IT asset and the one or more additional IT assets. The system crash remediation logic 118 is configured to apply one or more remedial actions, selected based at least in part on the system crash root cause analysis data structure, to at least a subset of the IT assets 106 to reduce a likelihood of the subset of the IT assets experiencing system crash events.

At least portions of the automated system crash analysis tool 112, the system crash event detection logic 114, the system crash event analysis logic 116, and the system crash remediation logic 118 may be implemented at least in part in the form of software that is stored in memory and executed by a processor.

It is to be appreciated that the particular arrangement of the client devices 102, the IT infrastructure 105, the system crash database 108 and the support platform 110 illustrated in the FIG. 1 embodiment is presented by way of example only, and alternative arrangements can be used in other embodiments. As discussed above, for example, the support platform 110 (or portions of components thereof, such as one or more of the automated system crash analysis tool 112, the system crash event detection logic 114, the system crash event analysis logic 116, and the system crash remediation logic 118) may in some embodiments be implemented internal to one or more of the client devices 102 and/or the IT infrastructure 105.

The support platform 110 and other portions of the information processing system 100, as will be described in further detail below, may be part of cloud infrastructure.

The support platform 110 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The client devices 102, IT infrastructure 105, the IT assets 106, the system crash database 108 and the support platform 110 or components thereof (e.g., the automated system crash analysis tool 112, the system crash event detection logic 114, the system crash event analysis logic 116, and the system crash remediation logic 118) may be implemented on respective distinct processing platforms, although numerous other arrangements are possible. For example, in some embodiments at least portions of the support platform 110 and one or more of the client devices 102, the IT infrastructure 105, the IT assets 106 and/or the system crash database 108 are implemented on the same processing platform. A given client device (e.g., 102-1) can therefore be implemented at least in part within at least one processing platform that implements at least a portion of the support platform 110.

The term "processing platform" as used herein is intended to be broadly construed so as to encompass, by way of illustration and without limitation, multiple sets of processing devices and associated storage systems that are configured to communicate over one or more networks. For example, distributed implementations of the information processing system 100 are possible, in which certain components of the system reside in one data center in a first geographic location while other components of the system reside in one or more other data centers in one or more other geographic locations that are potentially remote from the first geographic location. Thus, it is possible in some implementations of the information processing system 100 for the client devices 102, the IT infrastructure 105, IT assets 106, the system crash database 108 and the support platform 110, or portions or components thereof, to reside in different data centers. Numerous other distributed implementations are possible. The support platform 110 can also be implemented in a distributed manner across multiple data centers.

Additional examples of processing platforms utilized to implement the support platform 110 and other components of the information processing system 100 in illustrative embodiments will be described in more detail below in conjunction with FIGS. 8 and 9.

It is to be understood that the particular set of elements shown in FIG. 1 for automated system crash analysis and remediation is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

An exemplary process for automated system crash analysis and remediation will now be described in more detail with reference to the flow diagram of FIG. 2. It is to be understood that this particular process is only an example, and that additional or alternative processes for automated system crash analysis and remediation may be used in other embodiments.

In this embodiment, the process includes steps 200 through 208. These steps are assumed to be performed by the support platform 110 utilizing the automated system crash analysis tool 112, the system crash event detection logic 114, the system crash event analysis logic 116, and the system crash remediation logic 118. The process begins with step 200, monitoring an IT infrastructure environment for one or more designated system crash event types. The IT infrastructure environment (e.g., IT infrastructure 105) comprises a plurality of IT assets (e.g., IT assets 106).

Responsive to detecting at least one of the one or more designated system crash event types on at least a first one of the plurality of IT assets, one or more system crash log files are copied in step 202 from the first IT asset to a system crash database (e.g., system crash database 108). Copying the one or more system crash log files from the first IT asset to the system crash database may comprise searching one or more designated folders of the first IT asset and copying any system crash log files present in the one or more designated folders. The one or more system crash log files may be generated in response to system crash events occurring on the first IT asset. The one or more system crash log files provide a snapshot of a system state of the first IT asset at a time of at least one system crash event. The one or more system crash log files may comprise at least one minidump file or at least one crash dump file.

The one or more system crash log files copied to the system crash database are processed in step 204 to generate a first crash dump analysis data structure associated with the first IT asset. The first crash dump analysis data structure characterizes one or more parameters of the first IT asset experiencing at least one system crash event. Processing the one or more system crash log files copied to the system crash database to generate the first crash dump analysis data structure associated with the first IT asset may utilize a system crash debugging tool.

A system crash root cause analysis data structure is generated in step 206 based at least in part on the first crash dump analysis data structure associated with the first IT asset and one or more additional crash dump analysis data structures associated with one or more additional ones of the plurality of IT assets. The system crash root cause analysis data structure characterizes at least one root cause of system crash events occurring on the first IT asset and the one or more additional IT assets. The first and one or more additional crash dump analysis data structures may comprise extensible markup language (XML) files, and the system crash root cause analysis data structure may comprise a comma-separated value (CSV) file.

In step 208, one or more remedial actions, selected based at least in part on the system crash root cause analysis data structure, are applied to at least a subset of the plurality of IT assets to reduce a likelihood of the subset of the plurality of IT assets experiencing system crash events. The subset of the plurality of IT assets may be selected based at least in part on determining one or more common parameters of the first IT asset and the one or more additional IT assets. The one or more common parameters may comprise at least one of device error labels for system crash events, failure bucket identifiers for system crash events, device configuration information, and process details for processes running during system crash events. The subset of the plurality of IT assets may include at least one IT asset other than the first IT asset and the one or more additional IT assets. At least one of the one or more remedial actions may comprise updating one or more pieces of software installed on the subset of the plurality of IT assets, applying one or more patch fixes to one or more pieces of software installed on the subset of the plurality of IT assets, etc.

Figure 2:
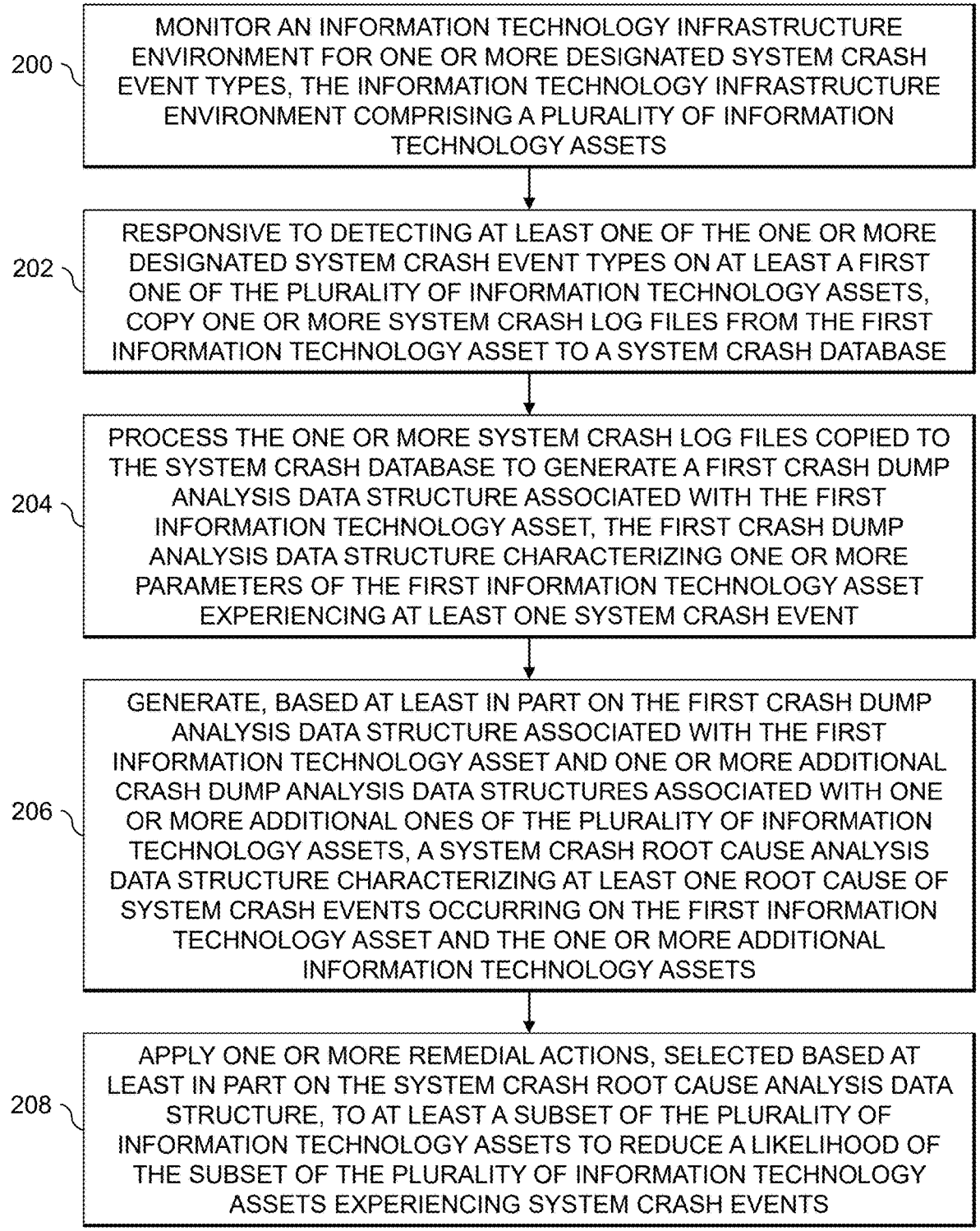
FIG. 2 is a flow diagram of an exemplary process for automated system crash analysis and remediation in an illustrative embodiment.

The particular processing operations and other system functionality described in conjunction with the flow diagram of FIG. 2 are presented by way of illustrative example only, and should not be construed as limiting the scope of the disclosure in any way. Alternative embodiments can use other types of processing operations. For example, as indicated above, the ordering of the process steps may be varied in other embodiments, or certain steps may be performed at least in part concurrently with one another rather than serially. Also, one or more of the process steps may be repeated periodically, or multiple instances of the process can be performed in parallel with one another for different system crash events, etc.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

System crashes, such as Blue Screen of Death (BSOD) events, may be the result of application, driver or hardware failure. System crashes are a common problem in the personal computer (PC) industry, with significant impacts on user experience, system performance and productivity. When a user faces a system crash, their productivity will be impacted until the system restarts, recovers from failure, and the user is able to work again. This may take at least 15 minutes in some cases. In critical scenarios, this might even corrupt an operating system (OS) and require OS re-installation, which might take even longer (e.g., a few hours).

Conventional approaches for handling system crashes are highly manual processes performed by IT support teams. The only way to capture relevant information to solve the problem of system crashes, in conventional approaches, is to perform a manual process to copy crash dump files or other logs one at a time, and for support engineers with specialized skill sets to process such crash dump files with a number of manual steps. This could take 20-30 minutes or longer for each crash dump file. Once the support engineers have manually reviewed the crash dump files, the support engineers are able to access the crash dump and understand the cause of a system crash. In a large IT infrastructure environment, there may be hundreds or thousands of system crash events which are identified daily, and processing the crash dump files for a thousand system crash events may take two weeks for support engineers to analyze manually. Illustrative embodiments provide technical solutions for enabling IT support platforms to reduce human dependency for capturing, analyzing and investigating system crashes at scale.

System crashes are an unpleasant surprise which no user or enterprise, organization or other entity wants to see, as system crashes come at a significant cost. Each system crash, for example, has costs associated with loss of productivity, downtime, data loss, hardware damage, technical support costs, etc.

Loss of productivity: a system crash can cause a computer to reboot, forcing users to lose any unsaved work and causing interruptions to their productivity.

Downtime: system crashes require a computer to be restarted, thus leading to system downtime which can lead to significant cost impacts for an enterprise, organization or other entity that relies on computer systems.

Data loss: in some cases, a system crash can lead to data corruption or data loss, which can be very costly, especially for enterprises, organizations or other entities that store critical data on computers.

Hardware damage: in some cases, a system crash can be caused by a hardware issue, which can potentially damage the computer's hardware and require costly repairs or replacements.

Technical support costs: if a system crash is caused by a software issue, it may require technical support to diagnose and fix the problem, which can incur costs for enterprises, organizations or other entities, as well as individuals (e.g., who do not have access to free support).

In a large enterprise, organization or other entity, telemetry tools indicate that there may be 1500-2000 system crashes daily.

A conventional manual process for handling a BSOD or other system crash event begins with identifying a system crash. Typically, this requires users to contact IT support, or an IT support agent must remote into a user's system to find out about the system crash. The IT support agent then collects a dump file or other logs (e.g., a Windows "minidump" crash file, which is created after a BSOD event). To do so, the IT support agent must connect to the user's system and copy the dump file or other logs to their system. The IT support agent then analyzes the dump file or other logs, which requires specialized skills and understanding of crash dump analysis applications. The IT support agent will have to analyze one dump file at a time for a single user. Once the analysis is completed, the IT support agent may get some information from a crash dump analyzer application, and will have to perform investigation for each user separately. After the investigation is completed, the IT support agent will have to apply a fix to a single system at a time.

Figure 3:
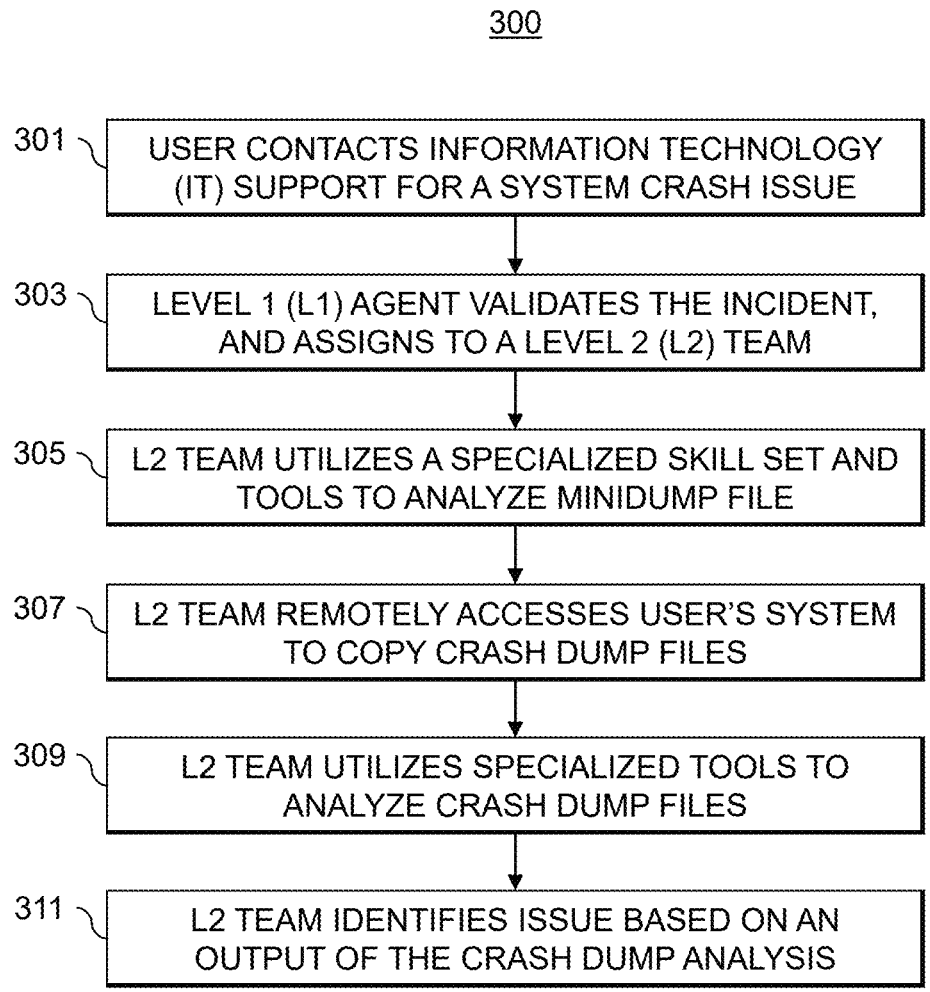
FIG. 3 shows a process flow for manual analysis of system crash events in an illustrative embodiment.

FIG. 3 shows a process flow 300 for manual handling of a BSOD or other system crash event. The process flow 300 begins with step 301, where a user contacts IT support for a system crash issue. In step 303, a level 1 (L1) agent of the IT support team validates the incident, and assigns it to a level 2 (L2) support team. In step 305, the L2 team utilizes a specialized skill set and tools to analyze the minidump or other crash dump file or logs generated by the system crash event. In step 307, the L2 team remotely accesses the user's system to copy crash dump files or other logs. In step 309, the L2 team utilizes specialized tools to analyze the crash dump files or other logs (e.g., one at a time, or at least in part in parallel for multiple files by different members of the L2 team). In step 311, the L2 team identifies the issue based on an output of the crash dump analysis. After copying the crash dump files or other logs in step 307, it may take 20-30 minutes to analyze a single one of the crash dump files or other logs manually.

Figure 4:
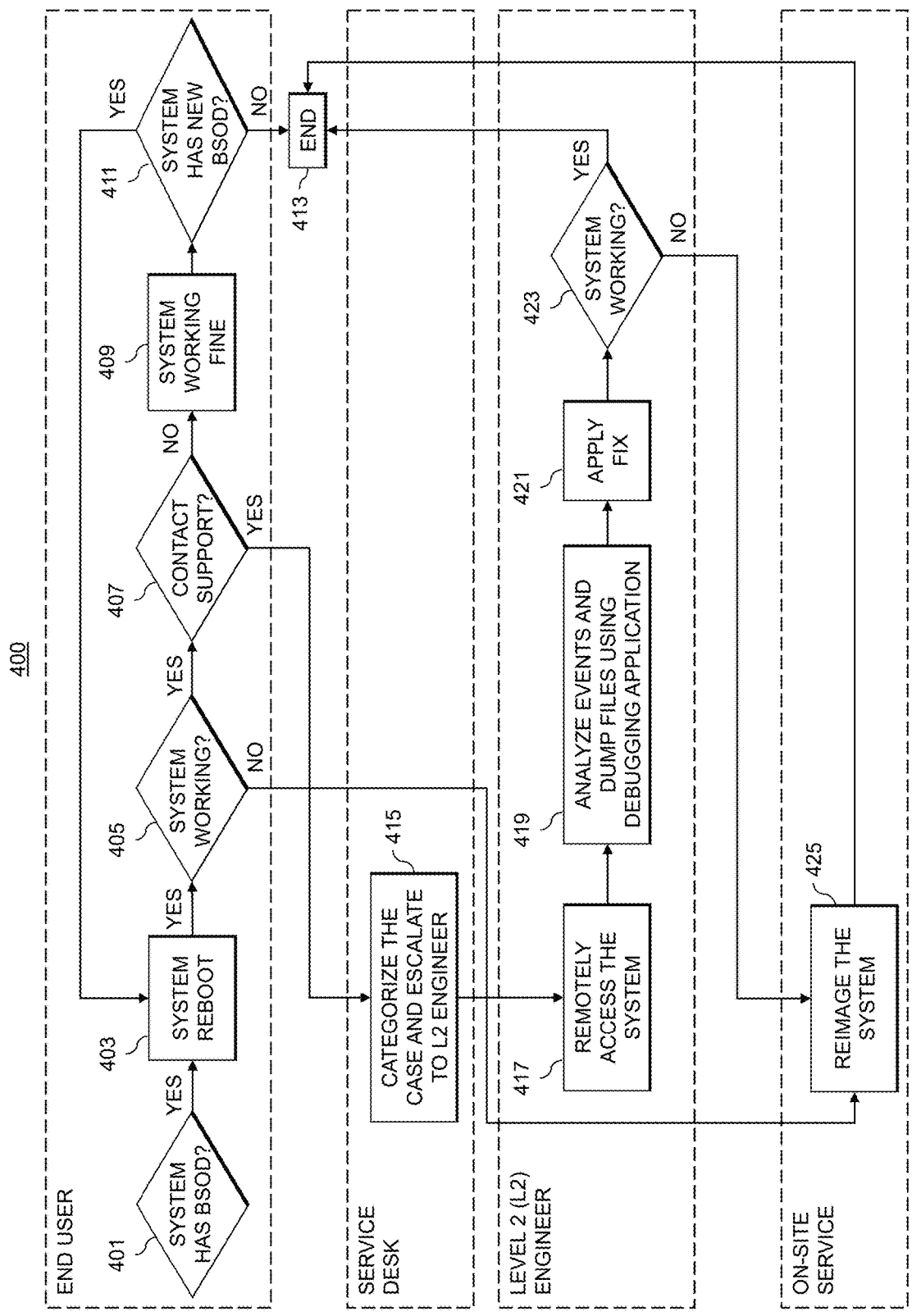
FIG. 4 shows a system flow for manual system crash analysis in an illustrative embodiment.

FIG. 4 shows a system flow 400 for manual BSOD analysis, which includes actions performed by an end user, an IT support service desk (e.g., L1 agents of an IT support team), an L2 engineer, and on-site service. The system flow 400 begins in block 401, where a system has a BSOD. In block 403, the end user reboots the system. In block 405, a determination is made as to whether the system is working following the reboot. If the result of the block 405 determination is yes, the system flow 400 proceeds to block 407, where the end user determines whether to contact an IT support team. If the result of the block 407 determination is no, then it is determined that the system is working fine in block 409. In block 411, a determination is made as to whether the system has a new BSOD. If the result of the block 411 determination is yes, the system flow 400 returns to block 403. If the result of the block 411 determination is no, the system flow 400 ends in block 413. In block 415, responsive to an affirmative determination in block 407, the service desk categorizes the case and escalates to the L2 engineer. In block 417, the L2 engineer remotely accesses the system. In block 419, the L2 engineer analyzes the BSOD event using the crash dump files (e.g., leveraging debugging applications). The L2 engineer applies a fix in block 421. In block 423, the L2 engineer determines whether the system is working. If the result of the block 423 determination is yes, the system flow 400 ends in block 413. If the result of the block 423 determination is no, or if the result of the block 405 determination is no, then the system flow 400 proceeds to on-site servicing and re-imaging the system in block 425, and then the system flow 400 ends in block 413.

Conventional approaches for analyzing system crashes suffer from various technical challenges, including that available tools do not provide enough information on system crashes, and are missing various information such as failure bucket identifier (ID), bug check string, bug check parameters, system details, Basic Input/Output System (BIOS) version, etc. Some of these parameters carry important information which is useful for investigating the root cause of system crashes with product teams or vendors. The technical solutions described herein provide an automated system crash analysis tool which is capable of analyzing large numbers of crash dump files quickly. By analyzing crash dump files in bulk, the automated system crash analysis tool provides a leading edge to address system crash events at an organization level and reduces productivity loss for users. The automated system crash analysis tool has the capability to analyze bulk crash dump files (e.g., .dmp files) or other logs and to generate analytic reports. The analytic reports may be shared with other product teams internally within an enterprise, organization or other entity, as well as with vendors to fix any applications that have bugs causing system crash events.

As discussed above, conventional approaches for analyzing system crashes are highly dependent on manual effort, starting from requiring a user to contact an IT support team for troubleshooting. Further, L1 teams must validate incidents, categorize them correctly, and move them to L2 teams. The L2 teams working on system crash analysis need to have specialized skill sets for crash analyzer tools, and must remotely access user systems to get minidump files (e.g., located at C:\Windows\Minidump) or other crash dump files or logs. The L2 teams will have to analyze the dump files or other logs using crash analyzer tools (e.g., WinDbg Preview by Microsoft). The crash analyzer tools will give a detailed report of the cause of system crashes, which is likely to consume significant time for both the user as well as the IT support team, and will lead to a loss of productivity hours, a loss of revenue, and other issues for each system crash event. Technical challenges of conventional manual processes include, for example, that only a limited number of users (e.g., 2%) will contact IT support teams in the event of system crashes, such that there is a lack of visibility into system crash events. Further, each BSOD or other system crash event on a system will lead to at least 10-15 minutes of downtime for the user, with corresponding productivity loss. Conventional approaches further require support engineers with specialized skill sets on tools used to analyze minidump or other crash dump files or logs. In addition, conventional approaches require support engineers to contact users to capture minidump or other crash dump files or logs, and are thus dependent on user availability. The support engineers must also spend significant time (e.g., 20-30 minutes for crash dump file) for each BSOD or other system crash event. The whole process from raising an incident to getting a fix, in conventional approaches, can take anywhere from an hour to days depending on support team and user availability.

A major setback of conventional approaches, as discussed above, is that such approaches are completely dependent on users contacting IT support teams. Thus, an enterprise, organization or other entity tends to lose out on visibility of many system crash events which users fail to report. Further, the time taken to analyze a single system crash can be significant (e.g., 20-30 minutes for a support engineer having specialized skills) once minidump or other crash dump files or logs are copied from the user's system. The whole process, from a user contacting an IT support team to getting a fix implemented, can take hours or even days. Conventional manual approaches thus cannot be effectively implemented in large-scale IT infrastructure environments, since there is no mechanism available that allows an IT support platform to capture minidump or other crash dump files or logs from user systems and analyze them at a large scale, and thus system crash events are always addressed one user at a time. Further, since conventional manual approaches cannot perform analysis at a large scale, such approaches cannot fix issues at an IT infrastructure level. Thus, fixes are applied to individual user systems, as and when issues are reported to IT support teams.

Figure 5:
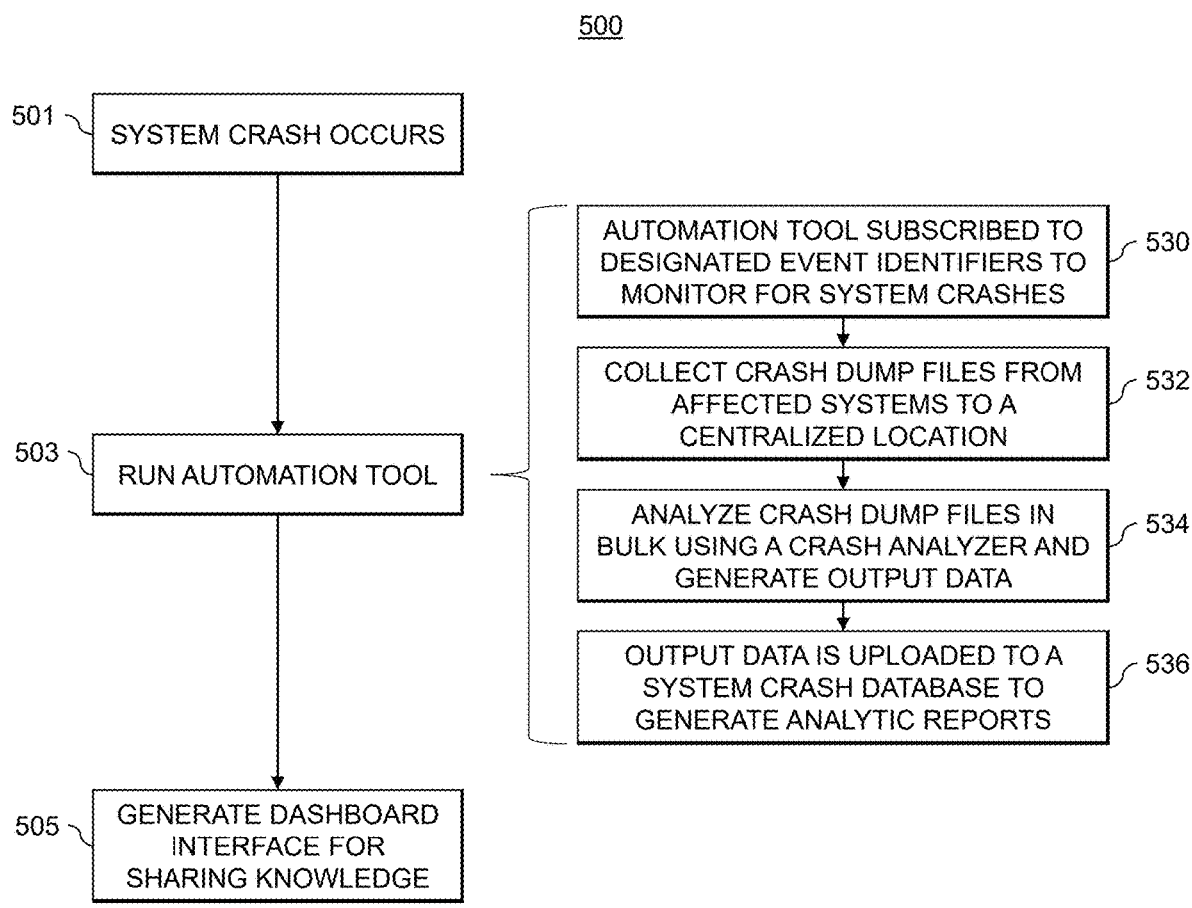
FIG. 5 shows a system flow for automated system crash analysis in an illustrative embodiment.

FIG. 5 shows a system flow 500 for automated system crash analysis (e.g., which may be implemented utilizing the automated system crash analysis tool 112). The system flow 500 advantageously does not require any manual steps or human intervention for analyzing the data. Thus, the system flow 500 has the capability to process a large number of system crash events (e.g., over 5000 system crash events in a day). The system flow 500 begins in block 501, where one or more system crashes occur. In block 503, an automation tool (e.g., the automated system crash analysis tool 112) is run. Running the automation tool in block 503 includes the processing of blocks 530, 532, 534 and 536. In block 530, the automation tool is configured (e.g., subscribed) to designated event identifiers (e.g., event ID 1001) to monitor for system crash events. In block 532, the automation tool will collect crash dump files (e.g., minidump files or other logs) from affected systems to a centralized location. In block 534, the crash dump files are analyzed in bulk using a crash analyzer tool and output data is generated. In block 536, the output data is uploaded to a database (e.g., system crash database 108) to generate analytic reports. Advantageously, running the automation tool in block 503 can take a small amount of time (e.g., 15 seconds) to analyze a single crash dump file. In block 505, a dashboard interface is generated for sharing knowledge (e.g., with other teams within an enterprise, organization or other entity, to vendors, etc.).

Figure 6:
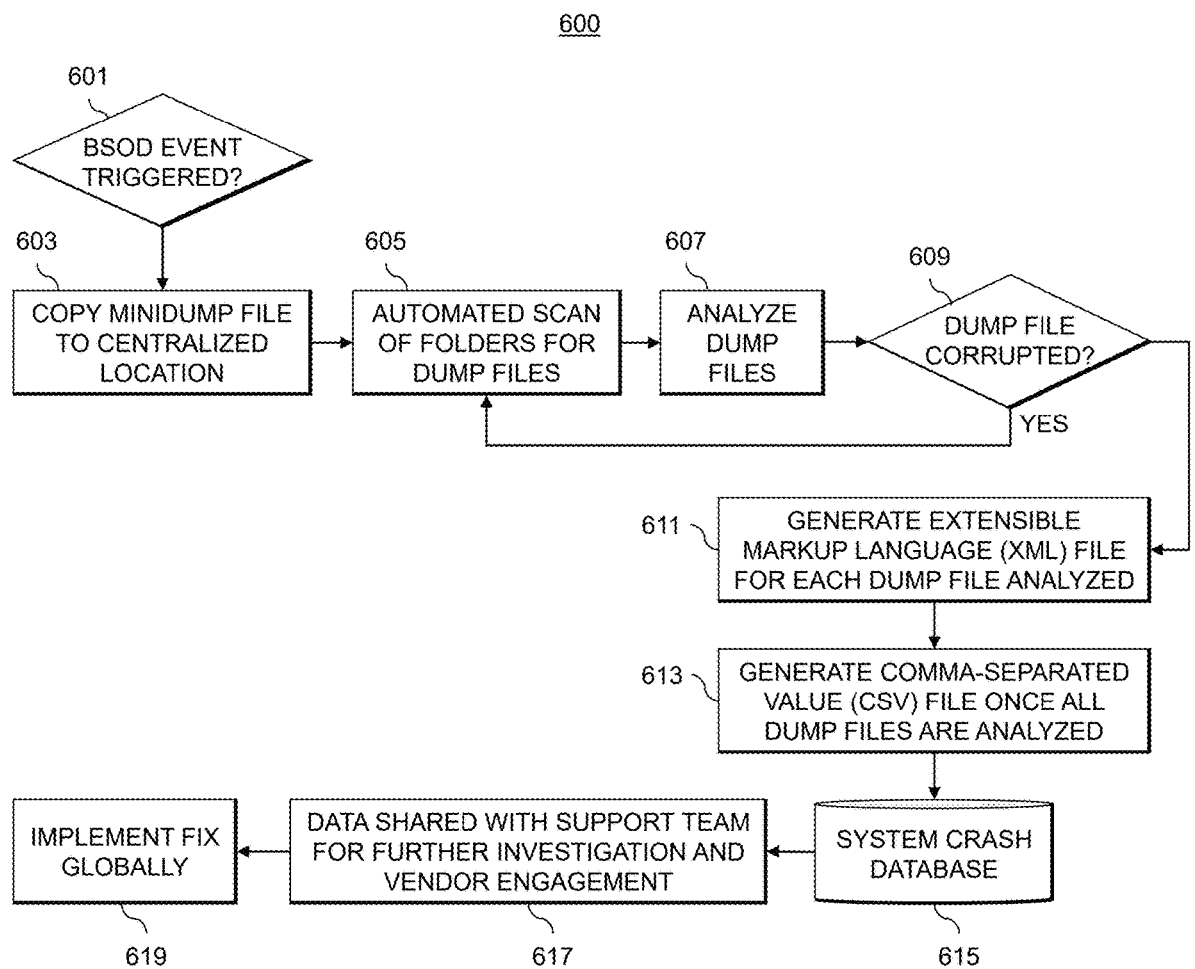
FIG. 6 shows a process flow automated analysis of system crash events in an illustrative embodiment.

FIG. 6 shows a process flow 600 for automated analysis of BSOD events. The process flow 600 begins in step 601, where a BSOD event is triggered. In step 603, a minidump file (e.g., generated in response to the BSOD event) is copied to a centralized location. In step 605, an automated scan of folders for dump files is performed. In step 607, the dump files which are found are analyzed. In step 609, a determination is made as to whether a dump file is corrupted. If the result of the step 609 determination is yes, the process flow 600 returns to step 605. If the result of the step 609 determination is no, the process flow 600 proceeds to step 611 where an extensible markup language (XML) file is generated for each dump file that is analyzed. In step 613, a comma-separated value (CSV) file is generated once all the dump files are analyzed. The XML and CSV files, which are generated in steps 611 and 613, are stored in a system crash database 615. In step 617, data from the system crash database 615 is shared with a support team for further investigation and vendor engagement, if appropriate. As a result of step 617, a fix may be identified for one or more BSOD events. In step 619, the identified fix is implemented globally (e.g., across IT assets operated by an enterprise, organization or other entity).

The automated system crash analysis tool described herein enables analysis of crash dump files or other system logs at scale (e.g., from a few files to thousands of files in a day). Further, the automated system crash analysis tool can reduce system crash analysis time (e.g., by up to 99.7%), which is crucial for identifying issues in a short period of time and at scale. Further, the automated system crash analysis tool eliminates the dependency on humans and manual effort.

In some embodiments, the logic for automation is that whenever a BSOD or other system crash event occurs on a system, an event with one or more designated event identifiers (e.g., Event ID 1001, BugCheck) is generated. Thus, the designated event identifiers are used as a trigger for an automation script to initiate a minidump or other crash dump file or log copy operation. Whenever a system crash event is generated, a script (e.g., a PowerShell script) is executed which has logic for searching for minidump or other crash dump files or logs in one or more designated folders (e.g., "C:\Windows\Minidump"). Once found, the script will copy all available files from such folders to a centralized location (e.g., a folder) in a data center for analysis.

A crash dump processing script is designed to scan the centralized location where the dump files are uploaded, and will execute commands for processing such files. In some embodiments, the crash dump processing script combines PowerShell and the WinDbg Preview application to open each crash dump file or log from the folder, and execute a command line in the Windbg Preview application to analyze that file and generate an individual XML file with all the information that is extracted from that file. This may take approximately 15 seconds to analyze and generate the XML file for a crash dump file (e.g., compared to 15-20 minutes or longer when done manually). A CSV file is generated which will have all the information from the individual XML files. The CSV file will be uploaded to a system crash database, which enables a dashboard to be created and shared with all teams for visibility and further analysis. For example, an engineering team may use this dashboard to address issues in an IT infrastructure environment at the infrastructure level. Visualizations are built to present the data to support engineers, product teams, etc. In some embodiments, a Microsoft Power BI dashboard is created to connect to the system crash database and provide visualizations of the system crash analysis data.

Figure 7A:
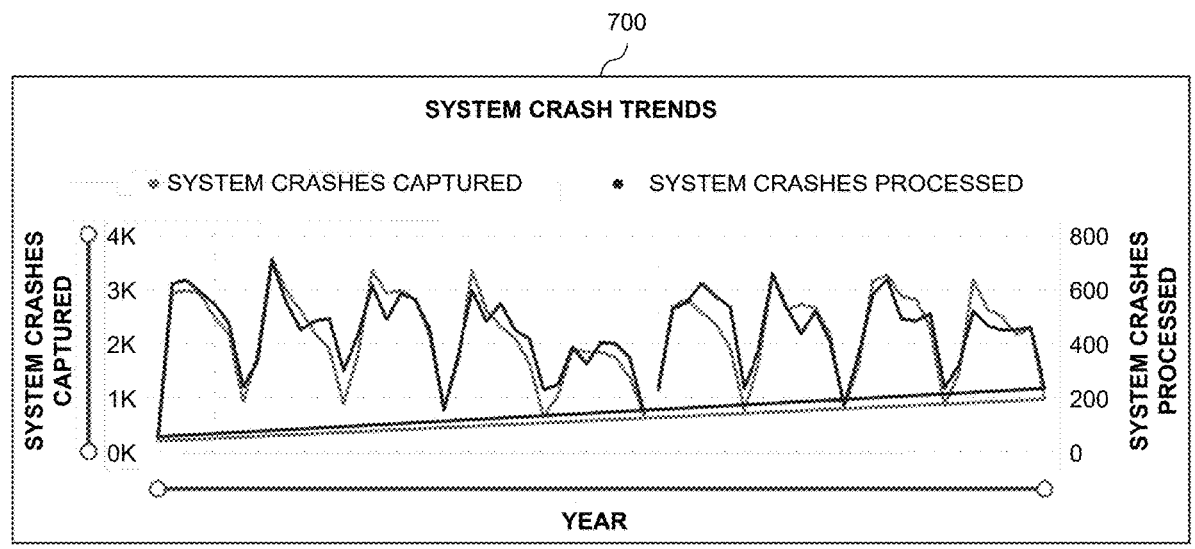

An example implementation of the automated system crash analysis tool in an IT infrastructure environment will now be described. The automated system crash analysis tool analyzed over 23000 system crash events over a period of 88 days, with a success rate of 100%. The automated system crash analysis tool is able to facilitate identification of the top causes of system crash events through data-driven analysis, which provides good results for escalating issues (e.g., to vendors). Further, the automated system crash analysis tool is able to fix top trending issues, through engagement with vendors and other stakeholders to roll out new versions of (or patches for) applications found to be the source of system crash events. FIGS. 7A-7C show different visualizations which may be generated utilizing the automated system crash analysis tool and presented via a dashboard or other graphical user interface (GUI). The dashboard or other GUI takes inputs from the analysis performed by the automated system crash analysis tool, and generates various visualizations including a system crash trends plot 700 as shown in FIG. 7A (illustrating capture and processing of system crash events over time) and summary statistics including table 705 shown in FIG. 7A (illustrating the total number of system crash events and the total number of systems which experienced system crash events). FIG. 7A also shows a table 710 showing statistics for system crash events across different product models (e.g., the number or count of system crash events experienced by different hardware IT asset models, such as different types of laptops, desktops, etc.). FIGS. 7B and 7C show tables 715, 720, 725 and 730 which may be generated by the automated system crash analysis tool. The table 715 shows different device error labels, and their corresponding quantity and percentage of occurrence in system crash events. The table 720 shows different failure bucket identifiers and their corresponding quantity of occurrence, the table 725 shows different image names (e.g., for executables, system drivers, hardware configurations, etc.) and their corresponding quantity of occurrence, and the table 730 shows different process names and their corresponding quantity of occurrence. Using such information presented in the plot 700 and the tables 705, 710, 715, 720, 725 and 730, appropriate remedial actions may be identified and performed to reduce the occurrence of future system crash events. The remedial actions (e.g., application updates, patches, system configuration changes, etc.) may be suitably prioritized and rolled out to different product models (e.g., based on information in the table 710), to address different types of device errors and/or failure bucket IDs (e.g., based on the information in tables 715 and 720), to address different device configurations with respect to the hardware configuration, driver configuration, processes which are installed and/or executing (e.g., based on the information in tables 725 and 730), combinations thereof, etc.

The automated system crash analysis tool is configured such that, once a BSOD or other system crash event is triggered, a script will copy the associated crash dump files or logs to a centralized location on a server in the data center in which the automated system crash analysis tool runs. The automated system crash analysis tool may implement a scheduled task (e.g., that will run hourly, daily, etc.) to analyze the crash dump files or logs collected from affected systems, with the result of the analysis of each crash dump file or log being extracted and used to generate an XML file, with the XML files being processed to generate a CSV file. Such files are then used to feed into a dashboard (e.g., to produce the various visualizations shown in FIGS. 7A-7C). The automated system crash analysis tool is able to process more than 4500 crash dump files or logs in a single day. On a daily basis, the automated system crash analysis tool is expected to analyze 500 or more crash dump files or logs, which leads to a greater than 95% reduction in manual work (e.g., as a skilled analyst may take anywhere from 15-30 minutes to analyze a single crash dump file, whereas the automated system crash analysis tool is able to analyze a single crash dump file in 15 seconds or less without any human intervention). The automated system crash analysis tool therefore enables an enterprise, organization or other entity to be proactive in analyzing and addressing BSOD or other system crash issues at an early stage and at scale, and for implementing fixes at a global level which leads to various cost savings (e.g., in productivity time of users, reducing the impact of the number of support calls or user escalations for system crash events, etc.).

The technical solutions described herein leverage automation to give a leading edge on removing human dependency from system crash analysis. The automated system crash analysis tool described herein utilizes a powerful script with well-defined logic for monitoring system crash events on all systems in an IT infrastructure environment. As soon as system crash events are identified, the automated system crash analysis tool will use the script to copy minidump (or other crash dump files or logs) from an affected system to a centralized location (e.g., on a data center or server implementing the automated system crash analysis tool). Thus, the automated system crash analysis tool eliminates the dependency on users to contact an IT support platform for assistance. Further, the automated system crash analysis tool can reduce the time taken to analyze a system crash event (e.g., a single minidump file) from around 20-30 minutes to 15 seconds or less, which is a greater than 99% reduction in time. Further, by adding a loop and implementing resilient data processing mechanisms, the automated system crash analysis tool is able to continually analyze minidump or other crash dump files or logs (e.g., 24/7, 365 days a year). This helps in analyzing system crash events at a large scale, and the output of the analysis can be extracted in a format that can be used to feed intelligence reports for data visualization and knowledge sharing with all relevant stakeholders. Further, since the analysis is done at scale, the automated system crash analysis tool addresses issues and identifies trends in order to understand the root causes of system crashes at a global level facilitating the rollout of new versions of applications or bug fix patches globally.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for automated system crash analysis and remediation will now be described in greater detail with reference to FIGS. 8 and 9. Although described in the context of system 100, these platforms may also be used to implement at least portions of other information processing systems in other embodiments.

Figure 8:
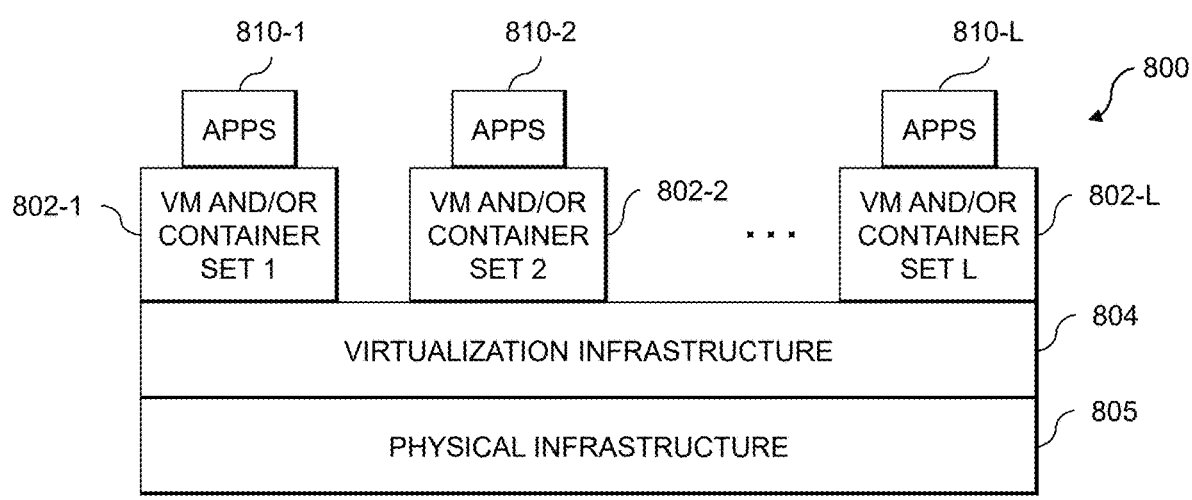
FIGS. 8 and 9 show examples of processing platforms that may be utilized to implement at least a portion of an information processing system in illustrative embodiments.
Figure 9:
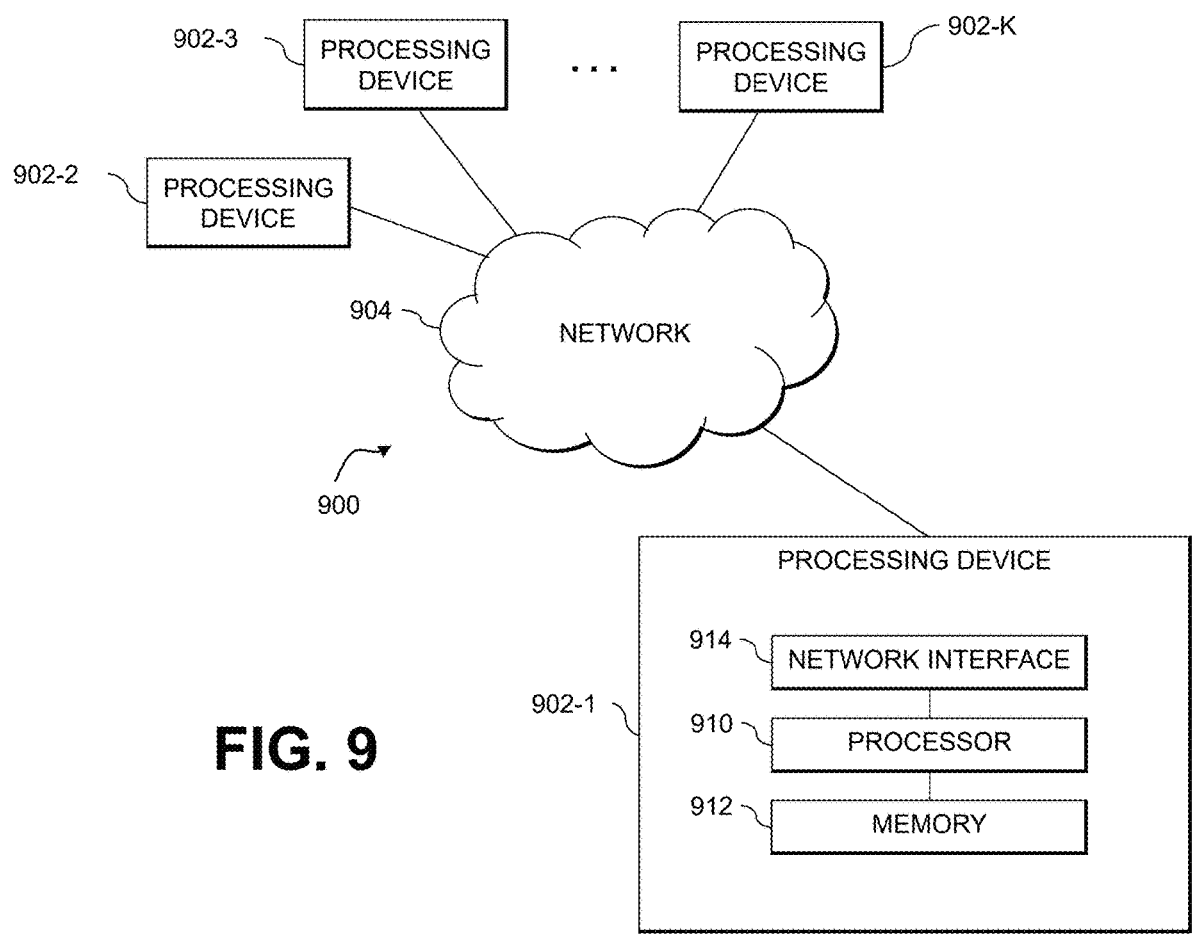

FIG. 8 shows an example processing platform comprising cloud infrastructure 800. The cloud infrastructure 800 comprises a combination of physical and virtual processing resources that may be utilized to implement at least a portion of the information processing system 100 in FIG. 1. The cloud infrastructure 800 comprises multiple virtual machines (VMs) and/or container sets 802-1, 802-2, . . . 802-L implemented using virtualization infrastructure 804. The virtualization infrastructure 804 runs on physical infrastructure 805, and illustratively comprises one or more hypervisors and/or operating system level virtualization infrastructure. The operating system level virtualization infrastructure illustratively comprises kernel control groups of a Linux operating system or other type of operating system.

The cloud infrastructure 800 further comprises sets of applications 810-1, 810-2, . . . 810-L running on respective ones of the VMs/container sets 802-1, 802-2, . . . 802-L under the control of the virtualization infrastructure 804. The VMs/container sets 802 may comprise respective VMs, respective sets of one or more containers, or respective sets of one or more containers running in VMs.

In some implementations of the FIG. 8 embodiment, the VMs/container sets 802 comprise respective VMs implemented using virtualization infrastructure 804 that comprises at least one hypervisor. A hypervisor platform may be used to implement a hypervisor within the virtualization infrastructure 804, where the hypervisor platform has an associated virtual infrastructure management system. The underlying physical machines may comprise one or more distributed processing platforms that include one or more storage systems.

In other implementations of the FIG. 8 embodiment, the VMs/container sets 802 comprise respective containers implemented using virtualization infrastructure 804 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 800 shown in FIG. 8 may represent at least a portion of one processing platform. Another example of such a processing platform is processing platform 900 shown in FIG. 9.

The processing platform 900 in this embodiment comprises a portion of system 100 and includes a plurality of processing devices, denoted 902-1, 902-2, 902-3, . . . 902-K, which communicate with one another over a network 904.

The network 904 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 902-1 in the processing platform 900 comprises a processor 910 coupled to a memory 912.

The processor 910 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 912 may comprise random access memory (RAM), read-only memory (ROM), flash memory or other types of memory, in any combination. The memory 912 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for automated system crash analysis and remediation as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, IT assets, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   the at least one processing device being configured:
      to monitor an information technology infrastructure environment for one or more designated system crash event types, the information technology infrastructure environment comprising a plurality of information technology assets;
      responsive to detecting at least one of the one or more designated system crash event types on at least a first one of the plurality of information technology assets, to copy one or more system crash log files from the first information technology asset to a system crash database;
      to process the one or more system crash log files copied to the system crash database to generate a first crash dump analysis data structure associated with the first information technology asset, the first crash dump analysis data structure characterizing one or more parameters of the first information technology asset experiencing at least one system crash event;
      to generate, based at least in part on the first crash dump analysis data structure associated with the first information technology asset and one or more additional crash dump analysis data structures associated with one or more additional ones of the plurality of information technology assets, a system crash root cause analysis data structure characterizing at least one root cause of system crash events occurring on the first information technology asset and the one or more additional information technology assets; and
      to apply one or more remedial actions, selected based at least in part on the system crash root cause analysis data structure, to at least a subset of the plurality of information technology assets to reduce a likelihood of the subset of the plurality of information technology assets experiencing system crash events.

2. The apparatus of claim 1 wherein copying the one or more system crash log files from the first information technology asset to the system crash database comprises searching one or more designated folders of the first information technology asset and copying any system crash log files present in the one or more designated folders.

3. The apparatus of claim 1 wherein the one or more system crash log files are generated in response to system crash events occurring on the first information technology asset.

4. The apparatus of claim 1 wherein the one or more system crash log files provide a snapshot of a system state of the first information technology asset at a time of at least one system crash event.

5. The apparatus of claim 1 wherein the one or more system crash log files comprise at least one minidump file.

6. The apparatus of claim 1 wherein the one or more system crash log files comprise at least one crash dump file.

7. The apparatus of claim 1 wherein the subset of the plurality of information technology assets is selected based at least in part on determining one or more common parameters of the first information technology asset and the one or more additional information technology assets.

8. The apparatus of claim 7 wherein the one or more common parameters comprise at least one of device error labels for system crash events and failure bucket identifiers for system crash events.

9. The apparatus of claim 7 wherein the one or more common parameters comprise at least one of device configuration information and process details for processes running during system crash events.

10. The apparatus of claim 1 wherein processing the one or more system crash log files copied to the system crash database to generate the first crash dump analysis data structure associated with the first information technology asset utilizes a system crash debugging tool.

11. The apparatus of claim 1 wherein the first and one or more additional crash dump analysis data structures comprise extensible markup language files, and wherein the system crash root cause analysis data structure comprises a comma-separated value file.

12. The apparatus of claim 1 wherein the subset of the plurality of information technology assets include at least one information technology asset other than the first information technology asset and the one or more additional information technology assets.

13. The apparatus of claim 1 wherein at least one of the one or more remedial actions comprises updating one or more pieces of software installed on the subset of the plurality of information technology assets.

14. The apparatus of claim 1 wherein at least one of the one or more remedial actions comprises applying one or more patch fixes to one or more pieces of software installed on the subset of the plurality of information technology assets.

15. A computer program product comprising a non-transitory processor-readable storage medium having stored therein program code of one or more software programs, wherein the program code when executed by at least one processing device causes the at least one processing device:
  to monitor an information technology infrastructure environment for one or more designated system crash event types, the information technology infrastructure environment comprising a plurality of information technology assets;
  responsive to detecting at least one of the one or more designated system crash event types on at least a first one of the plurality of information technology assets, to copy one or more system crash log files from the first information technology asset to a system crash database;
  to process the one or more system crash log files copied to the system crash database to generate a first crash dump analysis data structure associated with the first information technology asset, the first crash dump analysis data structure characterizing one or more parameters of the first information technology asset experiencing at least one system crash event;
  to generate, based at least in part on the first crash dump analysis data structure associated with the first information technology asset and one or more additional crash dump analysis data structures associated with one or more additional ones of the plurality of information technology assets, a system crash root cause analysis data structure characterizing at least one root cause of system crash events occurring on the first information technology asset and the one or more additional information technology assets; and
  to apply one or more remedial actions, selected based at least in part on the system crash root cause analysis data structure, to at least a subset of the plurality of information technology assets to reduce a likelihood of the subset of the plurality of information technology assets experiencing system crash events.

16. The computer program product of claim 15 wherein the subset of the plurality of information technology assets is selected based at least in part on determining one or more common parameters of the first information technology asset and the one or more additional information technology assets.

17. The computer program product of claim 15 wherein the subset of the plurality of information technology assets include at least one information technology asset other than the first information technology asset and the one or more additional information technology assets.

18. A method comprising:
  monitoring an information technology infrastructure environment for one or more designated system crash event types, the information technology infrastructure environment comprising a plurality of information technology assets;
  responsive to detecting at least one of the one or more designated system crash event types on at least a first one of the plurality of information technology assets, copying one or more system crash log files from the first information technology asset to a system crash database;
  processing the one or more system crash log files copied to the system crash database to generate a first crash dump analysis data structure associated with the first information technology asset, the first crash dump analysis data structure characterizing one or more parameters of the first information technology asset experiencing at least one system crash event;
  generating, based at least in part on the first crash dump analysis data structure associated with the first information technology asset and one or more additional crash dump analysis data structures associated with one or more additional ones of the plurality of information technology assets, a system crash root cause analysis data structure characterizing at least one root cause of system crash events occurring on the first information technology asset and the one or more additional information technology assets; and
  applying one or more remedial actions, selected based at least in part on the system crash root cause analysis data structure, to at least a subset of the plurality of information technology assets to reduce a likelihood of the subset of the plurality of information technology assets experiencing system crash events;
  wherein the method is performed by at least one processing device comprising a processor coupled to a memory.

19. The method of claim 18 wherein the subset of the plurality of information technology assets is selected based at least in part on determining one or more common parameters of the first information technology asset and the one or more additional information technology assets.

20. The method of claim 18 wherein the subset of the plurality of information technology assets include at least one information technology asset other than the first information technology asset and the one or more additional information technology assets.

* * * * *